July 5, 1966  K. J. KNUDSEN  3,258,970
ELECTRIC TEMPERATURE CONTROL
Original Filed Feb. 1, 1961  2 Sheets-Sheet 1
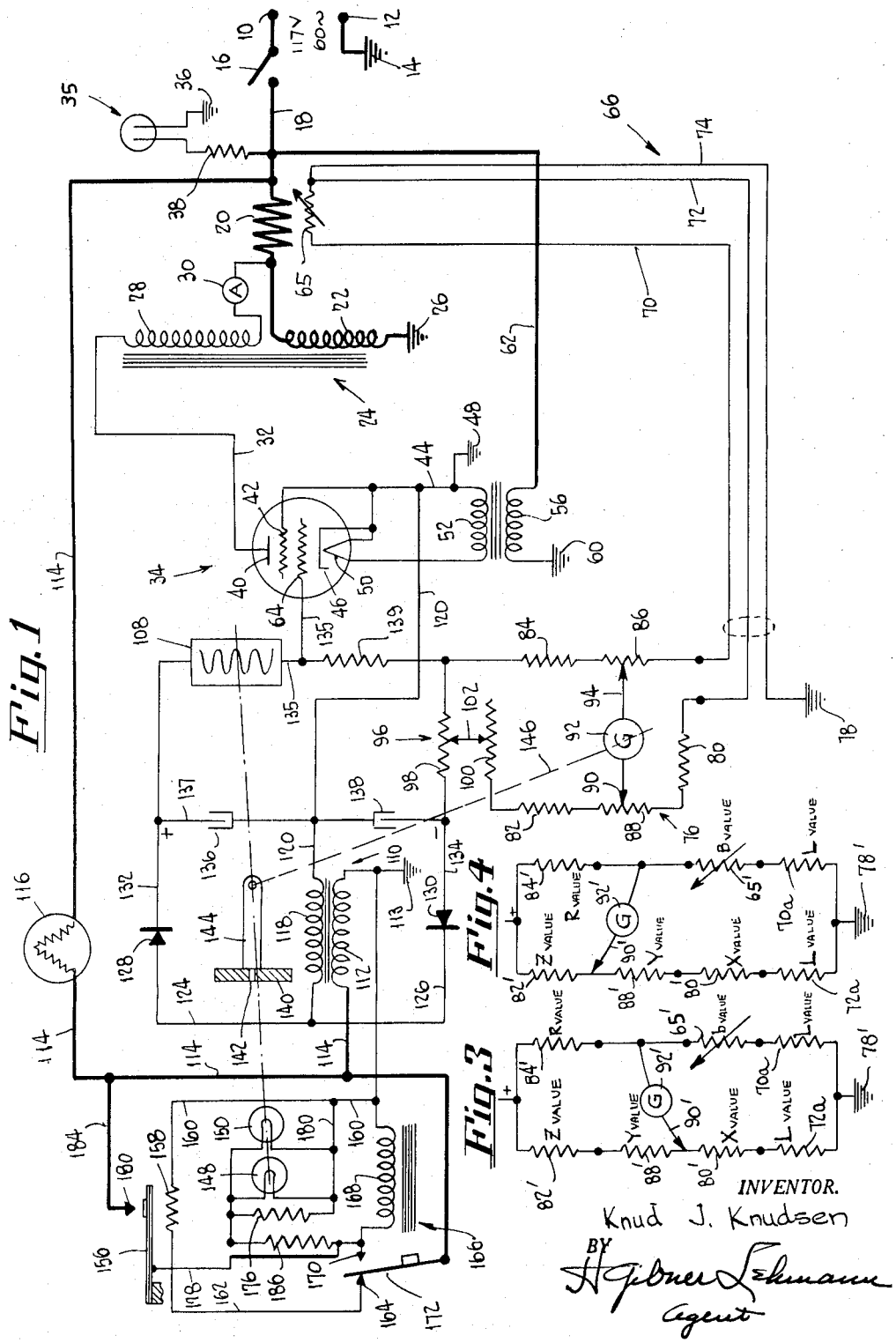
INVENTOR.
Knud J. Knudsen
BY
H. Gibner Lehmann
Agent

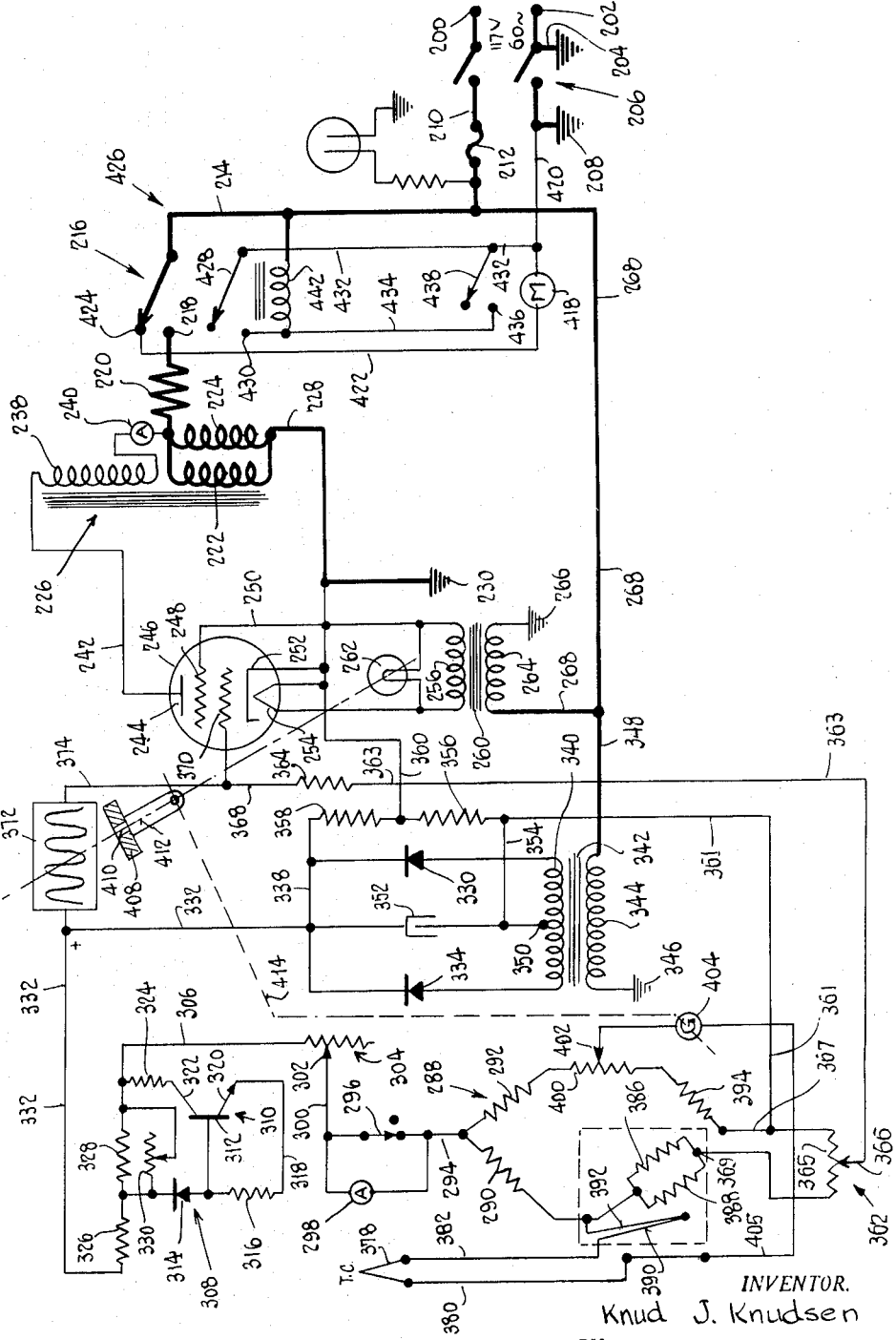

United States Patent Office 3,258,970
Patented July 5, 1966

3,258,970
ELECTRIC TEMPERATURE CONTROL
Knud J. Knudsen, Middlebury, Conn., assignor to Lewis Engineering Company, Naugatuck, Conn., a corporation of Connecticut
Original application Feb. 1, 1961, Ser. No. 86,432, now Patent No. 3,116,396, dated Dec. 31, 1963. Divided and this application July 23, 1963, Ser. No. 297,064
1 Claim. (Cl. 73—362)

This application is a division of my copending application Serial No. 86,432, filed February 1, 1961 and entitled "Electric Temperature Control," now Patent No. 3,116,396.

This invention relates to electric temperature control devices which are automatically operative, and more particularly to devices of this kind wherein the energization of an electrical heating means such as a resistance wire, heating element or the like is automatically controlled in accordance with the temperatures produced by such heating means.

The invention involves improvements in the automatic electric temperature control devices described and claimed in my Patent No. 2,761,052, dated August 28, 1956 and entitled "Electric Temperature Control." In this patent there are described temperature control devices wherein the circuit of an electric heating element is controlled by means including a vacuum tube to automatically effect energization and de-energization of the element for the purpose of maintaining the temperature of a medium such as an oil bath or the like, at a constant value. The temperature of the oil bath is sensed by a sensing element such as a thermocouple or resistance thermometer bulb, which is connected in a bridge circuit having in one form of the invention an electric instrument movement such as a galvanometer, which then is responsive to changes in the temperature of the oil bath.

In this form of the invention of my patent identified above the galvanometer is provided with a shutter by which light from an electric bulb may be controlled to energize or de-energize a photoelectric cell. The conductivity of the cell is thus a function of the movement of the galvanometer and accordingly reflects the changes in temperature of the oil bath. The photoelectric cell is connected in the grid circuit of a pentode vacuum tube preamplifier which is thus responsive to the conducting and non-conducting conditions of the cell. The pentode tube in turn is connected so as to control a Thyratron vacuum tube having in its plate circuit a power transformer of the auto-transformer type, which in turn is included in the circuit of the heating element to control the energization thereof.

In another form of the invention described in my patent neither the photocell nor the galvanometer is utilized but instead the unbalance of the bridge operates a transformer which controls the first grid of a double-triode preamplifier vacuum tube, by which an amplification of the control signal is obtained, the said double triode vacuum tube in turn being connected so as to control the Thyratron in the circuit of the heating element, thereby ultimately to control the energization of the latter.

In these patented systems it was necessary to utilize in conjunction with the Thyratron tube an additional vacuum tube control and amplifier means in order to effect a reliable control over the temperature of the oil bath when utilizing the relatively weak signal which is normally manifested at the bridge circuit connected with the thermocouple or resistance bulb. In one case a pentode vacuum tube preamplifier was utilized whereas in the circuit not having the galvanometer a double triode vacuum tube preamplifier was employed.

These arrangements involved additional components in the form of the added vacuum tubes and supplementary circuit elements, transformers, power supplies and the like, making the equipment more bulky and costly.

The above disadvantage of the devices of my identified patent are obviated by the present invention, and one object of the invention is to provide a novel and improved automatic temperature control device of the general type eliminating make-and-break contacts by use of a Thyratron vacuum tube, wherein no further vacuum tube devices in addition to the heater-controlling Thyratron are required. Thus, there is effected an appreciable simplification of the control device, a reduction in the number of components and a reduction in cost, together with improved reliability since fewer components exist which might be subject to breakage, failure and the like.

In accomplishing this the invention provides a novel rectifier-type energized and polarized signal circuit having a charged or polarity signal supplying capacitor for connection with the control grid of the Thyratron tube, such signal circuit utilizing a high current capacity, switching-type photosensitive cell capable of fast switching action involving appreciable values of current. The signal circuit embodying the said photosensitive cell is arranged to provide not only signals of opposite polarity selectively on the control grid of the Thyratron in a reliable manner without requiring the use of additional vacuum tubes and the associated components required therefor, but involves further a novel, capacitor-potential action to effectively render the Thyratron grid less negative so that conduction of the tube is quickly established.

A further object of the invention is to provide a novel and improved temperature control device as above outlined, which may utilize either a thermocouple type sensing element or else a resistance bulb type element, in sensing the temperature which is to be kept constant or controlled.

Another object of the invention is to provide, in an electric temperature control device employing a vacuum tube valve, an improved D.C. control circuit energized from an alternating current source and characterized by a charged filter capacitor adapted for connection through a conductive-type photosensitive cell to a control grid, which circuit in conjunction with A.C. energization of the vacuum tube provides a reliable and sensitive, fast-acting response of the tube to input signals of even small magnitude.

Still another object of the invention is to provide an improved combination comprising an electric temperature control involving a vacuum tube valve device and a time-delay relay, by which the filament or heater of the vacuum tube is given time to obtain its operating temperature prior to the application of signals to the tube.

Yet another object of the invention is to provide, in an electric temperature control, an improved Wheatstone bridge network having constants in the form of resistive components which are so related to each other that the same amount of error occurs at both the low and high limits of the operating range, independently of lead resistance of the temperature responsive or sensing element, within limits.

A feature of the invention resides in the provision of an improved control device as above set forth, which involves relatively simple, few components and which is extremely reliable in its operation at all times.

Other features and advantages will hereinafter appear.

In the accompanying drawings:

FIG. 1 is a schematic circuit diagram of one form of improved temperature control device as provided by the invention.

FIG. 2 is a schematic circuit diagram showing another form of the present improved temperature control device.

FIG. 3 is a schematic circuit diagram showing a simplification of the bridge circuit of FIG. 1 and indicating one extreme setting of the indicating slider corresponding to the "low" temperature value of the sensing element, which may for example be 50° centrigrade.

FIG. 4 is a schematic circuit diagram similar to that of FIG. 3 but showing the indicating slider at the opposite end of its path of travel, corresponding to the "highest" temperature reading, which may be for example 310° centigrade.

Considering first the circuit shown in FIG. 1, power supply terminals are indicated at 10 and 12. The terminal 12 is connected to a suitable common return or ground bus, indicated as a ground 14. The terminal 10 is connected through an on-off switch 16 to a lead 18 which is connected with an electrical heater device 20, the latter in turn being connected with a winding 22 of an autotransformer 24, said winding being also joined with a ground return 26. The autotransformer 24 has a control winding 28 connected through an ammeter 30 to the winding 22 as shown.

With this arrangement, if a switching connection is established between the remaining terminal 32 of the winding 28 and the ground by a switch device connected with ground, such as a Thyratron tube indicated at 34 in the diagram, a control will be established over the energization of the heater 20 from the supply terminals 10, 12.

An indication as to the on-off condition of this system and of the switch 16 is given by an indicator lamp 35 having one terminal connected to a ground 36 and having its other terminal connected through a resistor 38 to the "hot" lead 18.

The Thyratron 34 is shown as having a plate or anode 40 connected with the lead 32, and as having a screen grid 42 connected by a wire 44 with its cathode or reference element 46, the lead 44 being also connected to a ground return 48. The heater 50 of the Thyratron tube 34 is energized from the secondary 52 of a filament transformer 54 having a primary 56 connected to a ground 60 and to a "hot" lead 62 joined to the lead wire 18. The thyratron tube 34 has a control element or grid 64, on which the control signal is impressed.

The heat from the electric heater 20 is sensed by a resistance bulb 65 connected, by means of a cable 66 comprising wires 70, 72 and 74 to a bridge circuit which is designated generally by the numeral 76. The wire 74 is connected to a ground 78 as indicated. The resistance bulb 65 comprises one leg of the bridge 70, being connected by the wire 72 with a resistor 80, comprising a second leg. The two remaining bridge legs comprise resistors 82 and 84, the latter being connected to the lead wire 70 through a vernier resistor 86 which may have a low value, as for example 2 ohms. The resistors 80, 82 are connected with the resistance element 88 of a potentiometer device having a slider or contact arm 90 which is connected to the galvanometer or instrument movement 92. The movement 92 is connected to an adjustable contact arm 94 which is movable over the vernier resistor 86.

The resistance legs 82 and 84 are connected respectively to an anticipator device 96 the functioning of which will be described in detail at a later point, comprising resistors 98 and 100 which are engageable simultaneously by a slider 102 whereby an adjustable connection is effected between the resistors 98 and 100.

In accordance with the present invention, in conjunction with the A.C. energized Thyratron tube there is provided an improved, energized, rectifier-type D.C. control or signal circuit having a high-current conductive photosensitive cell, which effects a rapid and reliable response of the Thyratron at all times, even to signals of relatively small magnitude, the said control circuit being characterized by a charged, high-capacity filter condenser which can be directly connected to the Thyratron control grid through the photosensitive cell to drain the grid of its negative charge or electrons by connection with its positive terminal, thereby to insure quick conduction of the tube for the intervals of positive polarity of the anode thereof whenever a signal is present in the control circuit. The said control circuit may be triggered by a strong light beam which, as illustrated in FIG. 1, is under the control of movement of the galvanometer or instrument movement 92.

As shown, the polarized control circuit providing the grid 64 of the Thyratron tube 34 with the desired signal, comprises a photosensitive cell 108 of the type which becomes conducting in the presence of light and is capable of carrying appreciable current. The cell 108 is herein termed a conductive-type photosensitive cell, and may be that produced by the Jem Manufacturing Co., model or type COS–10. The cell 108 is used as a switching device in conjunction with a charged capacitor connected in the signal or grid input circuit. Such circuit also comprises a grid resistor, together with rectifier means for the purpose of effecting either a negative or a positive polarity on the control grid 64 of the tube 34.

As shown, the D.C. power supply for the signal circuit comprises a transformer 110 having a primary winding 112 connected to a ground 113 and also to a "hot" supply line 114 which latter is joined to the supply wire 18 and has in series with it a voltage regulator device 116 such as that known commercially as an "Amperite" voltage regulator. The transformer 110 has a second winding 118 connected with a lead 120, also called herein a "reference voltage point," going to the wire 44 and ground 48. The winding 118 is also connected with wires 124 and 126 leading to rectifiers 128 and 130 respectively, the rectifiers being connected to positive and negative-potential or voltage wires 132 and 134 respectively. From the wires 132 and 134, high-capacity filter condensers 136 and 138 lead to the grounded wire 120. The positive supply wire 132 is connected to the photosensitive cell 108 which is in turn connected by a wire 135 to the control grid 64 of the Thyratron tube 34. The grid lead 135 is also connected to a grid resistor or voltage drop device 139 which is joined to the juncture of the resistors 84 and 98. Also, the resistor 98 is connected to the negative wire 134 of the signal circuit.

With the above organization, when the photosensitive cell 108 is not subjected to light it will be essentially non-conducting, whereupon the negative potential on the wire 134 will prevail and be applied to the control grid 64 of the Thyratron tube 34 through the resistors 98 and 139, making the grid 64 negative with respect to the ground 48, and thus with respect to the cathode 46. The plus terminal 137 of the capacitor 136 will have an appreciable positive polarity, the capacitor being charged by the coil 118 and rectifier 128. Accordingly, the Thyratron will not conduct, for the above conditions, during those intervals when it is capable of conduction due to the anode 40 thereof being positively polarized by the alternating current applied to the power supply terminals 10, 12. If, however, the photosensitive cell 108 is subjected to an appreciable illumination it will be rendered conducting whereupon the positive potential on the wire 132 and terminal 137 of the capacitor will be applied to the wire 135 and will prevail over the negative potential manifested through the resistors 98, 139. That is, the resistors 98, 139 will now constitute an active load on the D.C. supply and capacitors 136 and 138. Accordingly a positive potential will be applied to the control grid 64 instead of the negative potential above mentioned. The resistors 98 and 139 are so arranged that for such circumstance they are able to withstand the application of the potential represented by the wire 135 being positive and the wire 134 being negative.

For such positive potential on the grid 64 the Thyratron 34 is rendered conducting, whereupon it will effect a closing of the circuit through the transformer coils 22, 28 in a manner such that the coil 28 causes a loading of transformer, which reduces the voltage drop across the coil 22 and effects an energization of the heater 20 from the terminals 10, 12. It will be understood that the above negative potential on the control grid 64 when the light cell 108 is not illuminated maintains the Thyratron tube 34 in a non-conducting condition, whereupon the windings 22, 28 of the auto-transformer 24 remain in effect open-circuited, thereby enabling the voltage of the source 10, 12 to be absorbed mostly by the transformer winding 22, resulting in little if any energization of the electric heater 20.

As further seen in FIG. 1, there is provided a light control means comprising a slotted plate 140 having an aperture 142, said plate being carried by a pivoted arm 144 which may, for example, comprise a portion of the movable component of the galvanometer or instrument movement 92. In FIG. 1 a broken line 146 indicates a mechanical connection between the arm 144 and the galvanometer movement 92 whereby a response of the galvanometer to an unbalance of the bridge 76 will effect a turning movement of the slotted plate 140. The plate 140 is arranged in front of the photosensitive cell 108, and incandescent bulbs 148 and 150 are placed in line with the slotted plate and the photo-cell 108 whereby light from the bulbs may pass through the aperture 142 in the plate 140 and strike the cell 108 when an unbalance of the bridge 76 due to low temperature of the element 65 deflects the galvanometer 92 in one direction. That is, the arrangement is such that for deflection of the galvanometer or instrument movement 92 due to a bridge unbalance resulting from the sensing element 65 being in a cold state, the slot 142 will be aligned with the bulbs 148, 150 and the photosensitive cell 108 whereby the latter will receive full illumination from the bulbs. This will render the Thyratron 34 conducting. And, when the medium being heated and the sensing element 65 are at the desired temperature the bridge circuit will balance and bring the galvanometer 92 to a position wherein a solid portion of the plate 140 obstructs light trying to reach the cell 108 from the bulbs 148, 150.

By the present invention, a novel and simplified time delay mechanism is associated with the bulbs 148, 150, in order to delay the energization of such bulbs at the time that the apparatus is first turned on. Thus, by delaying the lighting of the bulbs 148, 150 the Thyratron is prevented from being subjected to a signal which could place it in a conducting condition prior to the heater 50 thereof fully heating the cathode 46 to provide the necessary electron emission.

The time delay device comprises a bi-metallic switch arm 156 which is arranged in close proximity to a heater 158, the latter having one terminal connected by a wire 160 to the ground 113. The other end of the heater 158 for the bi-metallic arm 156 is connected by a wire 162 to a stationary contact 164 of a relay 166, such relay having a coil 168 connected to the ground wire 160. The other end of the relay coil 168 is connected to a stationary holding contact 170 of the relay, such contact and the first-mentioned stationary contact 164 being cooperable with the relay armature 172, which latter is connected by a wire 174 to the "hot" wire 114 of the system. The bulbs 148, 150 are bridged by a resistor 176, and one set of terminals of the bulbs and resistor is connected to one end of a current-limiting resistor 186 the other end of which is connected by a wire 178 to the bi-metallic switch arm 156. The remaining terminals of the bulbs and the resistor 176 is connected by a wire 180 to the ground wire 160. Cooperable with the bi-metallic switch arm 156 is a stationary contact 180 which is connected by a wire 184 with the "hot" line 114. Finally, the stationary contact 170 of the relay 166 is connected to the wire 178. By this arrangement the closing of the switch 16 effects an energization of the heater 158 which, after a short period, causes a flexing of the bi-metallic arm 156 whereby the relay coil 168 is energized as well as the bulbs 148 and 150. The interval of delay gives the heater-type cathode 46 of the Thyratron time to become fully heated.

Operation of the temperature control circuit shown in FIG. 1 is as follows:

When the on-off switch 16 is closed, there immediately will be effected energization of the Thyratron heater 50, and also energization of the bi-metallic arm heater 158, the bulbs 148, 150 meanwhile remaining unenergized. After an interval during which the cathode 46 has had an opportunity to become fully heated, the heater 158 will have fully flexed the bi-metallic switch arm 156, causing the same to energize the stationary contact 180. This now effects energization of the lamps 148, 150 from the "hot" wire 114 and through the wires 184, 178, 180 and resistor 186 to the ground 113. At the same time the relay coil 168 will become energized, thereby attracting the armature 172 and effecting a de-energization of the heater 158. Also, the relay armature 172 will now engage the stationary contact 170, thereby closing a holding circuit for the relay coil 160 through the wire 174. Accordingly, the bi-metallic arm 156 will now have an opportunity to return to its initial, open-circuit position. Energization of the lamps 148, 150 will be continued through the current limiting resistor 186 and through the holding circuit comprising the relay armature 172 and the supply wire 174.

Assuming that the heater 20 is in a cold state, as well as the sensing element 65, the bridge 76 will have an unbalanced condition whereby the deflection of the galvanometer 92 will cause the slot 142 of the plate 140 to be aligned with the bulbs 148, 150 and the photosensitive cell 108. The cell 108 will therefore be fully lighted, and its conducting condition will render the Thyratron grid 64 highly positive whereby the Thyratron will be made conducting. In consequence, the autotransformer 24 will function as a closed switch, causing full energization of the heater 20. As the latter raises the temperature of the oil bath or other medium, the sensing element 65 will become heated, resulting in increasingly less deflection of the galvanometer as the temperature rises. This will result in less and less illumination of the photocell 108 in consequence of the slot 142 of the plate 140 being moved out of alignment with the lamps 148, 150 and the photosensitive cell.

The result will be a decrease in the positive potential on the control grid 64 of the Thyratron tube 34, thereby reducing the plate current of the Thyratron which has the effect of increasing the impedance of the autotransformer in the heating circuit of the heater 20. Accordingly, the energizing current through the heater 20 will be reduced as the surrounding temperature becomes higher.

A point will be reached in the heating of the sensing element 65 where the balance of the bridge 76 will cause the galvanometer 92 to completely shut off light from the bulbs 148, 150 to the photosensitive cell 108. When this has occurred the Thyratron 34 is no longer conducting, and in consequence the autotransformer 24 functions as an open switch, terminating for all practical purposes the energization of the heater 20. Depending on where the cut-off point is for the Thyratron 34, such tube may be rendered non-conducting prior to complete shutting off of the light from the photosensitive cell 108, the controlling factor being the cut-off potential of the grid 64. With no light striking the photosensitive cell 108, the grid 64 will be essentially negative as a consequence of the potential supplied by the transformer coil 118 in conjunction with the rectifier 130 and filter capacitor 138.

With the photocell 108 fully illuminated and conducting, the grid 64 will have essentially a positive potential as supplied by the transformer 110 in conjunction with the rectifier 128 and capacitor 136. At some point between the full positive and full negative potentials supplied to the grid 64 there will be a cut-off, where the tube is rendered non-conducting from its conducting condition or is rendered conducting from its non-conducting condition.

Thus, by the above organization a lowering of the temperature of the heater 20 and sensing element 65 will tend to effect illumination or a greater illumination of the photosensitive cell 108 as controlled by the bridge 76 and galvanometer 92 together with the shutter 140, the increasing illumination bringing the control grid 64 more positive from its previous value whereby the Thyratron 34 is made conducting or is rendered more conducting. This will then energize the heater 20 to again raise the temperature, and the above cycle will be repeated continually, resulting in a close control of the temperature at the heater 20.

The anticipator action of the device 96 is as follows: Depending on the setting of the contact arm 102 of the anticipator device, a greater or lesser voltage will be introduced into the bridge circuit whenever the photosensitive cell 108 is conducting. If the arm 102 is more to the left, when viewing FIG. 1, the voltage introduced will be greater whereas if the arm 102 is more to the right, the introduced voltage will be less. For any setting of the arm 102, however, the total resistance represented by the resistance elements 98, 100 which is included in the bridge circuit will remain the same and will be a constant. The voltage introduced into the bridge circuit by the anticipator device 96 is in such a direction as to tend to decrease the unbalance of the bridge and to decrease the deflection of the galvanometer 92. With the arm 102 at the extreme right, the least amount of voltage is introduced, and thus there is the least opposing action to unbalance of the bridge and deflection of the galvanometer. However, when the arm 102 is located at the left end of its movement, the greatest amount of voltage is introduced into the bridge during the intervals of conduction of the cell 108, such voltage opposing to the greatest extent the unbalance and reducing the same, as well as the deflection of the galvanometer 92. This action has the effect of preventing overshooting of the galvanometer and control, and of preventing hunting. A detailed explanation of this type of anticipator control is found in my patent above referred to, No. 2,761,052, dated August 28, 1956.

Another embodiment of the invention is illustrated in FIG. 2, wherein the sensing device comprises a thermocouple as distinguished from the resistance bulb sensing element of FIG. 1. In FIG. 2 a different kind of time delay device is shown, and a somewhat different polarized signal or grid input circuit involving a conductive-type photosensitive cell of the kind shown in FIG. 1.

Considering FIG. 2 specifically, there are illustrated power supply terminals 200 and 202, the latter being connected to a ground 204. The terminals 200, 202 are also connected to a double-pole single-throw, on-off switch 206, to which there is further connected a second ground 208 as shown. The switch 206 has a "hot" line 210 connected to a fuse 212 which is in turn connected to a "hot" line 214 joined with a relay contact arm 216.

Cooperable with the arm 216 is a fixed contact 218 connected with a load or heater 220 which is joined to one set of terminals of parallel-connected coils 222 and 224 of an autotransformer 226, the remaining terminals being connected to a wire 228 joined to a ground 230, constituting the return of the power circuit for the heater 220.

The autotransformer 226 has a control winding 238 connected through an ammeter 240 to the load windings 222, 224. The control winding 222 is also connected by a wire 242 to the anode 244 of a Thyratron tube 246, by which operating polarity is brought to the anode as well as a connection being made with which the tube may effect a switching action to control the loading of the autotransformer 226.

The Thyratron 246 has a screen grid 248 connected by a wire 250 with a cathode 252, and has a heater 254 connected with the cathode 252 and energized from the secondary 256 of a filament transformer 260, such secondary being also connected to an incandescent bulb or light source 262 provided for use with the conductive photosensitive cell of the control. The transformer 260 has a primary coil 264 connected to a ground 266 and also to a "hot" wire 268 which joins the wire 214 mentioned above. Thus, the heater 254 of the Thyratron becomes energized, as well as the light source or lamp 262 upon the switch 206 being closed. However, closing of the switch 206 will not result in an operating potential being applied to the anode 244 of the Thyratron inasmuch as the switch 216 controls this part of the circuit. Therefore, the Thyratron will not be polarized for operation, insofar as its anode is concerned, at the time that the heater 254 is connected and is beginning to warm the cathode.

The thermocouple bridge is designated generally by the numeral 288, such bridge having a pair of resistor legs 290, 292 provided with a common connection 294 leading to a switch 296 across which an ammeter 298 is connected. The switch 296 and ammeter 298 are joined by means of a wire 300 to the movable arm 302 of a rheostat 304, which is in turn connected to the power supply wire 306 of the bridge, said wire constituting part of a transistor-type voltage control circuit 308. Such voltage control circuit is described and illustrated in my Patent No. 3,004,209, dated October 10, 1961 and entitled "D.C. Regulator and Control Circuit." It will be described here only briefly, in consequence.

The voltage regulator 208 comprises a transistor 310 having a base 312 connected to the junction of a crystal diode 314 and resistor 316, the latter being connected by a wire 318 to the emitter 320 of the transistor. The collector 322 of the transistor is connected through a resistor 324 to the output wire 306.

The crystal diode 314 is connected to the juncture of two resistors 326 and 328, the latter being bridged by a rheostat 330 and being also connected to the output wire 306. The resistor 326 is connected to an input wire 332, also termed a "positive voltage point," which receives a positive potential by virtue of connection to rectifiers 334 and 336 having a common junction 338. The rectifiers are connected to the ends of a center-tapped secondary winding 340 of a transformer 342 having a primary winding 344 connected to a ground lead 346 and to a "hot" line 348 joined to the wire 268.

The center tap 350 of the secondary 340 constitutes the negative voltage point or terminal of the D.C. supply circuit, and is connected to a filter capacitor 352 which is in turn connected to the juncture 338. Also, the center tap 350 is connected by a wire 354 to a pair of series-connected resistors 356, 358 having a common juncture, also termed herein a "reference voltage point," connected by a wire 360 to the ground 230. The resistor 358 is connected to the juncture 338 as shown. The center tap 350 is also connected through a wire 361, anticipator potentiometer device 362, wire 363 and a dropping resistor 364 to the control grid 370 of the Thyratron tube 246. The potentiometer 362 has a resistance element 365 of about 2 ohms, and a contact arm 366, which latter is joined to the wire 363.

The grid signal wire 368 is connected to the photosensitive cell 372 by a wire 374, by which a positive potential is established on the grid 370 when the cell is rendered conducting. The cell is in turn connected with the positive supply line 332 polarized by the rectifiers 334, 336 and charged by the capacitor 352.

With the above organization, the absence of light on the photosensitive cell 372 will result in its being non-conducting, whereby the negative potential at the center tap 350 of the transformer secondary 340 will be applied to the control grid 370 of the Thyratron 346, preventing conductive operation of the tube. No current, of course, will be flowing in the wire 363 for such condition. If, however, light strikes the photosensitive cell 372 so as to render it conducting, a positive potential from the line 332 and capacitor 352 will be applied to the control grid 370, overcoming the negative polarization through the resistor 364. This will cause the Thyratron to conduct, whereupon it will load the autotransformer 226 and cause the latter to function as a closed switch. The dropping resistor 364 is arranged to withstand the difference of potential between the negative line 354 and the positive line 352, when the cell 372 is conducting, as will be understood.

The sensing element which is arranged to respond to the temperature of the heater 220 comprises a thermocouple 378 which is located either in proximity to the heater 220 or else in heat-conducting relation thereto, in any desired manner. The thermocouple 378 has terminal wires 380 and 382, the latter being connected to a cold junction compensator comprising a circuit set apart by the broken rectangular outline 384. This compensator may comprise one of the legs of the bridge, and includes parallel-connected compensating resistors 386 and 388 consisting of copper and nickel, together with a cold junction comprising Alumel and copper wires 390, 392. The bridge 288 has a fourth resistive leg 394 connected to the element 365 of the anticipator potentiometer by a wire 367. The element 365 is connected to a common junction 369 of the parallel resistors 386 and 388.

The bridge further has a six-ohm slide wire potentiometer device 400, the ends of the slide wire being connected respectively to the legs 292 and 394, said device having a slider 402 connected to a galvanometer 404 which is in turn connected to the thermocouple terminal wire 380 by a wire 405. The thermocouple leads 380, 382 may be respectively of Chromel and Alumel, and the wire 405 may be of copper.

The control further has a shutter comprising a plate 408 having an aperture 410, the said plate being carried by a pivotal arm 412 which is shown by means of the broken line 414 as having a mechanical connection with the galvanometer or instrument movement 404. The arrangement of the shutter, galvanometer and photosensitive light cell is generally the same as that described above in connection with FIG. 1. When the heater 20 and thermocouple 378 are in a cold condition, the galvanometer 404 is deflected by virtue of the bridge being unbalanced, and such deflection brings the aperture 410 of the shutter 408 in line with the photosensitive cell 372 and the light bulb 262. Accordingly, the photosensitive cell will be illuminated, and its conductive condition will render the Thyratron 346 conductive. As the temperature of the heater 220 and the thermocouple 378 rises, the deflection of the galvanometer 404 will become less whereby light will be gradually shut off from the photosensitive cell 372, thereby rendering the latter less and less conducting to the end that the positive potential on the control grid 370 of the Thyratron will be reduced or changed toward negative, ultimately shutting off the Thyratron. Thus, the control action is similar to that already described above.

By the invention a novel combination comprising the above control means in conjunction with a time delay is provided, to put off the supply of positive operating potential to the anode 244 of the Thyratron 246 until the heater of the tube has become thoroughly warmed and is emitting electrons. The delay device comprises a motor 418 having one terminal connected by a wire 420 to the ground 108, and having its other terminal connected by a wire 422 to a contact 424 which is cooperable with the relay arm 216 (alternately with the contact 218). The relay, indicated generally by the numeral 426, has a second set of cooperable contacts 428, 430 joined respectively by wires 432 and 434 to the ground wire 420 and to a switch contact 436 associated with the motor 418. A movable switch contact 438 is connected to the wire 432 and is arranged to be engaged with the contact 436 after the motor 418 has completed a certain number of revolutions, upon its being energized. The relay 426 has a coil 442 connected at one end with the "hot" wire 214 and at the other end with the wire 434.

Operation of the control device shown in FIG. 2 is as follows: The on-off switch 206 is first closed. This results in energization of the transformers 342 and 360. Energization of the latter transformer effects energization of the Thyratron heater 254 as well as the light bulb 262. Energization of the transformer 342 provides the D.C. potential between the wires 332 and 354, in the signal control circuit of the Thyratron tube 246. Also, closing of the switch 206 effects energization of the motor 418, and the latter begins its rotation. After a series of revolutions the motor 418 will close the switch comprising the contacts 436, 438. This delay interval is sufficient to enable full heating of the Thyratron heater and cathode 254, 252.

Closing of the switch 436, 438 now energizes the relay coil 442, whereupon the relay contacts are shifted, thereby connecting the heater 220 in its energizing circuit which includes the autotransformer coils 222, 224, and the ground 230.

Since at first the heater 220 is cold, as well as the thermocouple 378, the galvanometer 404 will be deflected and the aperture 410 of the shutter 408 will be aligned with the light bulb 262 and the photosensitive cell 372. Accordingly, such cell will be rendered conducting, and the positive polarization of the terminal 338 of the capacitor 352 will be brought to the control grid 370 to pull off the charge and render the Thyratron 246 conducting, whereupon this latter will load the autotransformer 226 to cause the coils 226, 224 thereof to exhibit very low impedance so that the transformer will function as a closed switch. Accordingly, the heater 220 will be energized, raising the temperature of the oil bath or the like and also the temperature of the thermocouple 378.

As the temperature of the latter rises, the deflection of the galvanometer 404 will be reduced, thereby reducing the illumination of the photosensitive cell 372 and reducing the positive potential impressed on the control grid 370. The action of the Thyratron will thus be similar to that already described in connection with FIG. 1.

When the photosensitive cell 372 is no longer conducting, the grid 370 will be negative with respect to the ground and the cathode 252, essentially by the amount of voltage drop existing across the resistor 356, and for such condition the Thyratron tube 246 will be non-conducting, whereupon the energization of the heater 220 will be discontinued.

The inclusion in the bridge 288 of the potentiometer device 362 constitutes an adjustable anticipator device which has a number of advantages. When the Thyratron 246 is rendered conducting by illumination of the cell 372 the circuit established through the latter includes the potentiometer 362. For, from the positive point 332 current will flow through the cell 372, wire 374, resistor 364, wire 363, potentiometer 362, wire 361 to the negative point 354. This current introduced into the bridge circuit will have the effect of reducing the deflection of the galvanometer whenever the bridge goes to unbalance because the photosensitive cell 372 is conducting and is causing an energization of the heater load 220. Thus, an anticipator action is had which prevents overshooting and hunting of the control, and enables a condition of balance to be more quickly reached in the bridge circuit.

In accordance with the present invention a set of values is provided for the components of the bridge 76 illustrated in FIG. 1, by which the extent of error in degrees centigrade is the same for both the minimum and maximum values of temperature readings, or temperatures intended for the bulb 65' and which are to be measured. In the present instance these values are 50° centigrade and 310° centigrade.

The resistance values of the bridge components in order to obtain the said equal amounts of error in the low and high extremes of the readings are derived as follows, reference being had to FIGS. 3 and 4 of the drawings. In these figures, the essential components of the bridge 76 are shown, and the lead resistances corresponding to the wires 70 and 72 are indicated by the letter L, such resistances being represented by resistors 70a and 72a respectively in the circuit.

FIG. 3 indicates the setting of the slider 90 for the lowest temperature reading of 50°, whereas FIG. 4 indicates the setting of the slider 90 for the maximum temperature reading of 310° centigrade.

Applicant has found that it is possible for the maximum error, at either of these temperatures, to be less than 0.1° centigrade for resistance values in each lead of from 0 ohms to 2 ohms. For such changes in the lead resistance the extent of error in the low reading is the same as the extent of error at the high reading, and the error decreases for readings in between the said limits.

In FIGS. 3 and 4 the bridge components previously identified by numbers have also been lettered for convenience in setting forth the equations by which the ohmic values are obtained.

Considering first FIG. 3, for a balanced condition of the bridge it will be seen that the following formulas hold:

(1) $$\frac{R}{b}=\frac{Z+Y}{X}$$

(2) $$\frac{R}{b}=a$$

(3) $$\frac{Z+Y}{X}=a$$

(4) $$Z=aX-Y$$

Considering now the setting of the bridge indicated in FIG. 4, the following formulas hold:

(5) $$\frac{R}{B}=\frac{Z}{Y+X}$$

(6) $$\frac{R}{B}=A$$

(7) $$\frac{Z}{Y+X}=A$$

(8) $$Z=AY+AX$$

The following equation, referring to the bridge network, sets forth the relations of the bridge components in order that the error (in degrees temperature) will be the same at both ends of the indicator setting, the letter "B" representing the temperature value at the high indicator setting and the letter "b" representing the temperature value at the low indicator setting:

(9) $$\frac{b-X}{(X+Y)-B}=\frac{b(\Delta b)}{B(\Delta B)}$$

where $\Delta b$ is the differential resistance per degree C. at the low setting, and $\Delta B$ is the differential resistance per degree C. at the high setting.

Solving for $b-X$, Equation 10 is obtained, as follows:

(10) $$b-X=\frac{b(\Delta b)}{B(\Delta B)}[(X+Y)-B]$$

Let the quantity $$\frac{Bb(\Delta b)}{B(\Delta B)} \text{ equal } C$$

Then, from Equation 10 there is obtained:

(11) $$b-X=CX+CY-CB$$

and

(12) $$b-X+CB-CX=CY$$

from which

(13) $$Y=\frac{b-X+CB-CX}{C}=\frac{b+CB-X(C+1)}{C}$$

Let $$\frac{(b+CB)}{C}=K$$

and let $$\frac{(C+1)}{C}=M$$

Then

(14) $$Y=K-MX$$

From Equation 4, substituting for Y, there is obtained:

(15) $$Z=AX-K+MX$$

From Equation 8, substituting for Y, there is obtained:

(16) $$Z=A(K-MX)+AX$$

(17) $$Z=AK-AMX+AX$$

Eliminating Z in Equations 15 and 17, there is had:

(18) $$aX-K+MX=AK-AMX+AX$$

Solving for X:

(19) $$X(a+AM-A+M)=K+AK$$

(20) $$X=\frac{K(A+1)}{a-A+M(A+1)}$$

Considering the bridge 76 set forth in FIG. 1 and utilizing the values already given, where the resistance of the bulb ranged from 107.39 ohms at 50° to 250.25 ohms at 310° centigrade the maximum error at these extreme temperatures was less than 0.1° centigrade when changing the resistance of each lead from 0.2 ohms, as stated.

It will now be seen from the foregoing that Equations 4, 14, and 20 may be utilized to obtain the values of the resistors 80, 88 and 82 for a given resistor R and a given bulb having high and low resistance values of B and b respectively, and a given set of lead resistances.

Below are given values of the components of the circuits of FIGS. 1 and 2, and the above equations have been utilized in arriving at the resistance values of the bridge 76 illustrated in FIG. 1.

The heater 20 representing the load may have a power rating of 1500 watts. The voltage regulator 116 may be of the type known as Amperite No. 2H–11. The secondary 118 of the transformer 110 provides 25 volts. The resistor 176 shunted across the lamps 148, 150 has a resistance of 70 ohms. The series resistor 186 is 500 ohms, the series resistors 158 is 450 ohms, the grid resistor 136 for the Thyratron has a resistance of 3500 ohms. The anticipator resistors 98 and 100 have 400 ohms resistance each.

The bridge leg 82 has a resistance of 2211 ohms. The adjustable bridge resistor 88 has a resistance of 132.82 ohms. The bridge resistor 80 has a resistance of 110.15 ohms. The vernier adjustable resistor 86 has a resistance of 2 ohms. The bridge resistor 84 has a resistance of 2699 ohms. The rectifiers 128 and 130 may be of solenium or silicon, and may be of the kind known commercially as type M20. The conductive photosensitive cell 108 may be of the type commercially available on the market under model No. CDS 10.

A representative set of values of resistance, voltage, current, power, etc. in connection with the circuit of FIG. 2 is as follows:

As with the circuit of FIG. 1, the load 220 may be a 1500 watt electric heater. The transformer coil 238 has a 600 volt rating. The transformer coils 22, 224 are each rated at 120 volts.

The filament transformer 260 is a Stancor model P-3062. The transformer secondary 256 provides 5 volts. The vacuum tube 246 may be type 632B. The transformer 342 is a Dano 14–25 v. D.C. X23–3. The grid resistor 364 has 20,000 ohms and a one watt rating. The rectifiers 334, 336 are type M20.

The resistors 356 and 358 each have 10,000 ohms resistance. The filter capacitor 352 is an electrolytic, 80 mfd. at 150 volts. The resistor 326 has 5,600 ohms and a rating of one watt. The resistor 316 has 500 ohms, the resistor 330 has 20 ohms, the resistor 328 has 12 ohms, and the resistor 324 has 500 ohms resistance.

The rheostat 304 has 100 ohms resistance, and the resistor 324 has 500 ohms resistance. The rheostat 304 is adjusted to provide a current of 5.4 mils in the meter 298.

In the bridge, the resistors 290 and 292 are each 2,680 ohms, carrying 2.7 milliamperes. The bridge resistor 400 is a six ohm slide wire potentiometer. The bridge resistor 394 has eight ohms.

In each of the circuits of FIGS. 1 and 2 the conductive condition of the photosensitive cell connects the control grid of the Thyratron tube directly to the positive terminal of the filter capacitor means whereby the negative charge on the grid is quickly drawn off by and into the capacitor means with the full capacity of the condenser behind such action, which is independent of frequency, to quickly render the tube conducting so that a fast response characteristic is had. Condenser discharge actions from one terminal of a capacitor, by which a pulse is delivered without attenuation from the presence of any series resistors connected to the terminal and wherein a single distinct return path is not readily observable, are known in connection with high voltages which effect a spark discharge. As at present understood the capacitor-backed grid discharge action of the signal circuit of FIGS. 1 and 2, unattenuated by any series resistor connected to the positive capacitor terminal, is somewhat of this nature except that lower voltages are present, of a value not capable of a "jump discharge."

Variations and modifications may be made within the scope of the claim, and portions of the improvement may be used without others.

I claim:

A resistance thermometer having errors of equal magnitude at the high and low ends of the scale for different bulb lead resistances, comprising a Wheatstone bridge having three resistor legs X, Z, R and a resistance bulb, connected in series with each other in clockwise order as given, the bulb having cold and hot resistance values at predetermined operating temperatures of $b$ and $B$ respectively and said bridge having bulb leads L of resistivities equal to each other connected in series with the bulb, and having a potentiometer and a galvanometer connected to the potentiometer arm, said galvanometer being also conected to the junction between the R and resistance bulb legs and the potentiometer resistance unit Y being connected between the X and Z legs, the values of X, Y and Z being given by the following equations:

$$X = \frac{K(A+1)}{a - A + M(A+1)}$$
$$Y = K - MX$$
$$Z = aX - Y$$

where:

$$K = \frac{b + CB}{C}$$

$$C = \frac{b(\Delta b)}{B(\Delta B)}$$

$\Delta b$ = differential resistance per degree centigrade at the low setting $\Delta B$ = differential resistance per degree centigrade at the high setting $A = R/B$ $a = R/b$ $M = C + 1/C$ No references cited.

LOUIS R. PRINCE, *Primary Examiner.*